US005578820A

United States Patent [19]
Gadeken et al.

[11] Patent Number: 5,578,820
[45] Date of Patent: Nov. 26, 1996

[54] METHOD FOR DETERMINING CEMENT THICKNESS IN A WELL ANNULUS

[75] Inventors: Larry L. Gadeken; Harry D. Smith, Jr., both of Houston, Tex.

[73] Assignee: Halliburton Company, Dallas, Tex.

[21] Appl. No.: 430,985

[22] Filed: Apr. 28, 1995

[51] Int. Cl.$^6$ .............................. G01V 5/00; G01V 5/06
[52] U.S. Cl. ........................................ 250/256; 250/258
[58] Field of Search .................................. 250/256, 258, 250/259, 260, 303

[56] References Cited

U.S. PATENT DOCUMENTS

| | | | |
|---|---|---|---|
| 4,527,058 | 7/1985 | Smith, Jr. .................................. | 250/256 |
| 4,542,292 | 9/1985 | Ellis ........................................ | 250/256 |
| 4,825,071 | 4/1989 | Badeken et al. ......................... | 250/256 |
| 5,001,342 | 3/1991 | Rambow ................................. | 250/256 |
| 5,410,152 | 4/1995 | Gadeken ................................. | 250/260 |

*Primary Examiner*—Constantine Hannaher
*Assistant Examiner*—Virgil O. Tyler
*Attorney, Agent, or Firm*—Conley, Rose & Tayon, P.C.

[57] ABSTRACT

A method is disclosed for determining the thickness of cement that has been placed in an annulus between a casing string and a wellbore penetrating a formation, wherein the method includes the steps of: logging the amount of radioactivity emitted by a radioactive material in the formation prior to emplacement of the casing and cement, including in the cement an amount of the radioactive material, placing the casing and cement in the wellbore, logging the amount of radioactivity emitted by the radioactive material and transmitted through the casing and calculating the amount of cement in the annulus by determining the amount of the radioactive material in the annulus.

9 Claims, 3 Drawing Sheets

METHOD FOR DETERMINING CEMENT THICKNESS IN A WELL ANNULUS

TECHNICAL FIELD OF THE INVENTION

The present invention relates to a method for determining cement thickness downhole in a well that has been cased and cemented. More particularly, the present invention discloses a method for using gamma ray emissions from potassium, which is a constituent of common cement additives, to determine the thickness of the cement, so that additional radioactive tracers need not be added to the cement. The present invention further discloses a method for measuring the cement thickness based on potassium gamma ray emissions even when the formation itself contains naturally occurring potassium or other radioactive elements.

BACKGROUND OF THE INVENTION

Measurement of radioactive emissions downhole is a well established, widely used technique for monitoring the position and movement of fluids in the well or various aspects of the formation. For example, natural gamma ray logs have provided an important contribution to the evaluation of downhole reservoirs. The naturally occurring radioactive elements potassium (K), uranium (U), and thorium (Th) are the sources of the gamma rays typically counted in such gamma ray logging. Potassium, thorium and uranium have different depositional properties, exhibit different solubility characteristics, and respond differently to diagenetic processes. Therefore, valuable geological and physical parameters, and important information for assisting in well log analysis and reservoir production can be obtained from both absolute and relative K, U, and Th concentrations.

In addition to measurement of gamma rays from naturally occurring sources, radioactive tracers are widely used in subsurface applications for identifying the presence of particular fluids or other additives. Such fluid tracers are for the most part used in marker applications such as identifying communicating zones, cement tops, and hydraulic fractures.

Gamma ray spectroscopy logging tools measure the energy as well as the intensity of the gamma rays, thereby allowing extraction of significantly more information from the log. Measurements made with spectral gamma ray tools have gained wide acceptance because the contributions of two or more isotopes with distinct gamma ray signatures can be determined simultaneously. Hence, spectral gamma ray logging tools are used to distinguish the gamma rays emitted by naturally occuring radioactive elements in the formation from those emitted by individual radioactive tracer(s) introduced in the course of various downhole operations to assist in monitoring the effectiveness of such operations.

Various analysis techniques have been developed in the quest to extract maximum information from gamma ray spectroscopy data. These analysis techniques include the spectrum stripping method originally used and, lately, calibration of the spectroscopy tools to gamma ray response "fingerprints" that enable the use of a weighted-least-squares algorithm. The latter technique allows the use of Compton down-scattering information to be used more effectively to extract additional information, such as estimation of the diameter of a column of radioactive material.

A Compton ratio is defined as a count rate in the high energy part of the gamma ray spectrum (where Compton downscattering contributions are small) divided by a count rate in the low energy portion of the spectrum (where Compton downscattering contributions are greatest). The Compton ratio can be calibrated to give the average diameter of a column of material that contains any radioactive material that emits a distinct gamma ray signature. Furthermore, this concept can be extended to the simultaneous use of more than one gamma-ray-emitting radionuclide. In the case of multiple radioactive isotopes, the weighted-least-squares algorithm is used to generate a borehole and formation component for each isotope, which in turn are summed to yield a composite spectrum for each isotope. The Compton ratio for each isotope thus can be generated on the basis of this composite spectrum.

When a radioactive tracer is to be used to quantitatively measure the presence and thickness of a cement column around a casing string, it is desirable to mix a sufficient amount of tracer uniformly into the cement such that the signal emitted by that tracer is readable through the casing once the cement has been emplaced. The well is logged immediately after cementing with a spectral gamma ray tool. Because the tool can discriminate between gamma rays of different energies, the spectral log can distinguish the tracer from all other gamma rays present. This selectivity means that the activity of the radioisotopes need not overwhelm the formation signal, but rather can be logged at activities only somewhat greater than the natural background radiation levels.

In conventional operations in which a radioactive tracer is used, it is preferable to clean out the hole before logging in order to minimize the presence in the borehole of extraneous radioactive material that would otherwise confound measurement of the tracer signal. Likewise, it is desirable to utilize radioactive tracers giving gamma ray signals that are easily separated from those of naturally occurring radioactive isotopes. Hence, it is typical that the radioactive tracer that is added to the cement be one that is not naturally occurring when it is desired to use gamma ray spectroscopy to determine the presence or thickness of cement.

Artificially generated radioisotopes are disadvantageous, however, in that they may pose significant environmental, health and safety risks. Each such potential tracer emits radiation, and Federal regulations govern handling and deployment of virtually all radioactive materials. Hence, these disadvantages would be avoided if the analysis could be performed without the use of non-naturally occurring radioactive tracers. Thus, it would be preferable to use elements or isotopes that are already present in either the cement or formation as a basis for indicating the presence and thickness of the cement.

SUMMARY OF THE INVENTION

The present invention comprises a method for using gamma ray spectroscopy for determining the effectiveness of cement placement between casing string and the wellbore. According to the present invention, the gamma ray spectrum emitted by potassium is used as the signal indicative of cement placement. Because potassium chloride is a commonly used cement additive, the use of additional radioactive tracers can be avoided, minimizing environmental health and safety considerations. Additional regulatory limitations on the use of radioactive materials are also avoided, as potassium chloride can be used at levels that are comparable to levels normally used at present.

Potassium chloride is commonly used to accelerate setting of the cement and to protect the surrounding clays. The potassium in this salt includes a fraction of potassium $^{40}K$ which emits a 1.461 MeV gamma ray. But for the fact that potassium and its radioactive isotopes occur naturally in many formations, the detected spectrum from potassium could be used qualitatively to detect the presence of cement in the annulus outside the casing, or quantitatively, to measure its thickness. When the formation itself includes naturally occurring $^{40}$K, however, it has heretofore been impossible to separate the gamma ray emissions of the formation from those of the potassium containing cement, because the same radioactive isotope is present in the cement and in the formation. The present invention teaches how to extract the information relevant only to the cement.

The present method includes running a "before" log to determine the radioactivity present in the formation, and running an "after" log to determine total radioactivity in the well once the cement has been placed outside the casing. The "before" log is "subtracted" from the "after" log, taking into account attenuation due to the casing, the cement sheath, and the fluid inside the casing, to give a net log of the radiation attributable to the cement. This net log is then used to calculate the cement annulus thickness based on the amount of potassium present in the annulus accounting for only the shape of the potassium spectrum.

BRIEF DESCRIPTION OF THE DRAWINGS

For a detailed description of a preferred embodiment of the invention, reference will now be made to the accompanying Figures, wherein.

DETAILED DESCRIPTION OF THE INVENTION

Open Hole Log

According to the present method, a "before" log of the open hole is made prior to casing and cementing. This log provides a benchmark that is indicative of the gamma rays emitted by naturally occurring radioactive isotopes present in the formation. Such naturally occurring isotopes typically include potassium, thorium and uranium. In a preferred embodiment, a gamma ray spectroscopy tool is used for this initial log, so that the fraction of the total signal attributable to potassium can be separated from that attributable to uranium and thorium, or other elements.

Logging Tool

Figure 1:
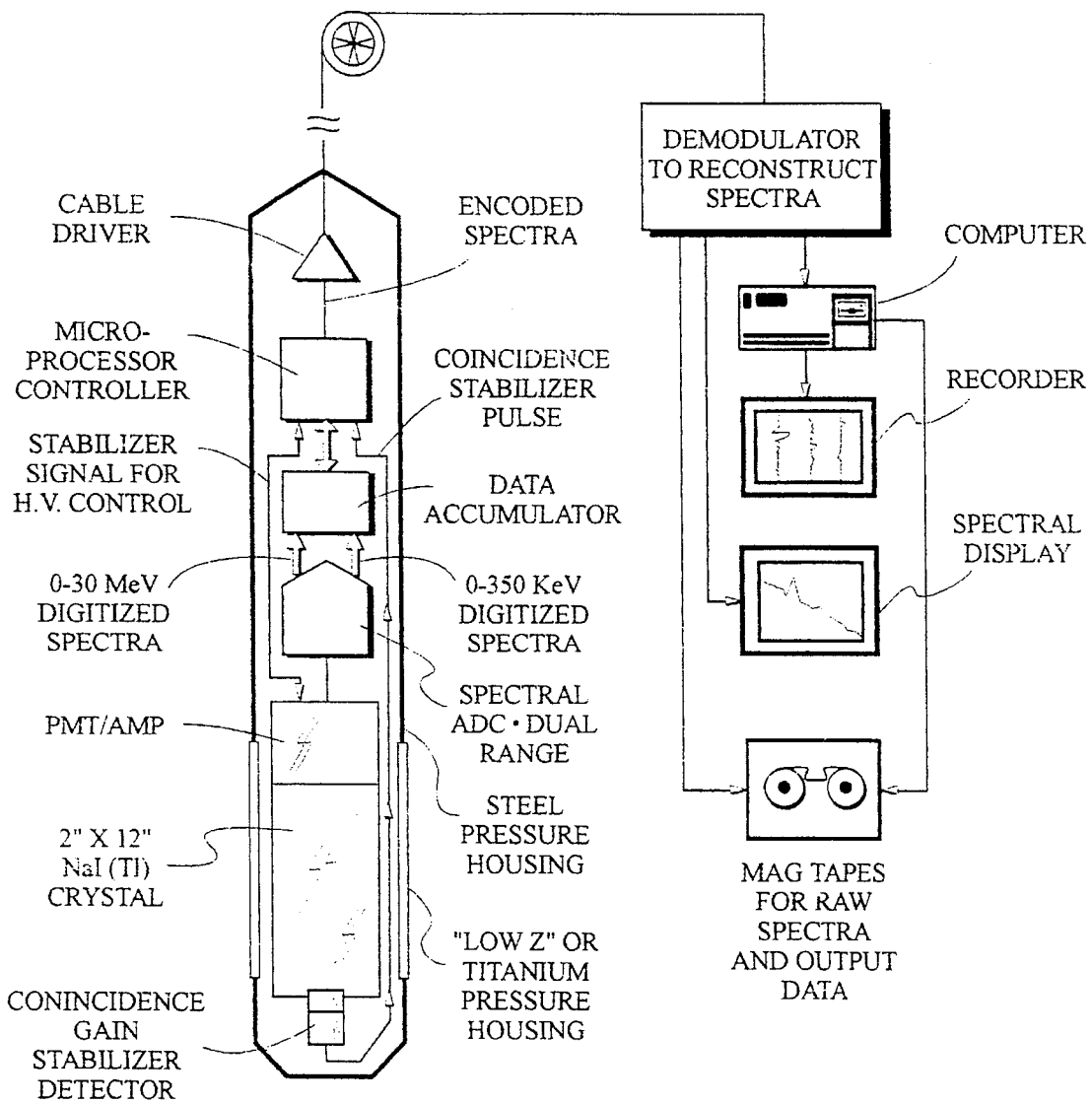
FIG. 1 is a schematic view of a spectral gamma ray logging tool.

Spectroscopic gamma ray tools are known in the art. For most logging situations, where relatively low pressures (10,000 psi) and low temperatures (275° F.) are encountered, and where some combination applications are not essential, the preferred gamma ray spectroscopy tool incorporates a low atomic number toolcase section as shown in FIG. 1. This configuration permits measurement of more gamma rays at lower energies than conventional steel pressure housings, thus permitting more accurate diameter determinations.

The preferred logging tool may be any conventional gamma ray logging tool that transmits 768 channels of spectral data to the logging truck at the surface. The coincidence (stabilizer) events are converted into a 256 channel spectrum which spans the energy range from 0–350 keV. The anticoincidence (formation gamma radiation) events are converted into two spectra; one 256 channel spectrum spans the low energy range from 0–350 keV, and is used primarily in the photoelectric lithology and casing measurements. The other 256 channel spectrum spans the high energy range 0–3000 keV, and is used in the borehole compensated K-U-Th determinations, etc.

According to a preferred embodiment, the three spectra are accumulated in the tool and are transmitted to the surface computer system approximately each 0.25 feet while logging. A telemetry tape, including spectral information, is recorded at the top of the logging cable, and the two formation spectra (high energy and low energy) are then transferred into the truck computer. The high energy spectrum is preferably broken down into a number of contiguous energy windows that are selected to encompass specific peaks from potassium, uranium, and thorium between 150 keV and 3 MeV.

In addition to the log curves generated in this manner, it is also possible in real-time to periodically output on a film record the actual low and high energy formation spectra (integrated over a statistically meaningful depth interval). This permits the user to visually ascertain the gain stability of the system and to ensure the absence of noise in the data.

Determination of K, U, Th Concentrations

Basic tool Response

The basic response of the gamma ray spectroscopy tools can be written as $$[C]=[A][M], \qquad (1)$$

where:

$$[C] = \begin{bmatrix} c_1 \\ c_2 \\ \cdot \\ \cdot \\ \cdot \\ c_m \end{bmatrix} \quad [A] = \begin{bmatrix} a_{1,Th} & a_{1,U} & a_{1,K} \\ a_{1,Th} & a_{1,U} & a_{1,K} \\ \cdot & & \\ \cdot & & \\ \cdot & & \\ a_{m,Th} & a_{m,U} & a_{m,K} \end{bmatrix}, \text{ and } [M] = \begin{bmatrix} M_{Th} \\ M_U \\ M_K \end{bmatrix}. \qquad (2)$$

and $c_i$=the count rate recorded in window i of the gamma ray spectrum (i=1, . . . , m) - counts/sec $a_{ij}$=the sensitivity matrix element for window i and element j (j=Th, U, K, for example)

$M_j$=the elemental concentration of element j

According to a preferred method, the sensitivity matrix elements $a_{ij}$ are determined in test formations containing known concentrations of Th, U, and K. Elemental concentrations are obtained by solving Eq. (1) for M according to well-known weighted-least-squares (WLS) technique.

Cement Log

After the open hole log is made, the well can be cased and cemented as desired. According to the present method, a second spectral log or cement log is run once the hole has been cased and the cement emplaced between the casing and the borehole. The open hole log is modified or compensated as set forth below in order to account for attenuation of the formation radiation as it passes through the casing and cement that were not present at the time of the open hole log. The modified open hole log is then subtracted from the cement log, leaving only count rates attributable to potassium in the cement. This compensated net log is then used in a quantitative calculation of the amount of potassium, and hence cement, in the annulus. In a preferred embodiment, a Compton degradation measurement is also performed, yielding an independent measurement of the average radius for the cement. Thus, the present invention results in two independent cement diameter measurements, allowing significantly more accurate estimates of the diameter of the cement annulus.

One way in which a cement diameter measurement can be calculated from the gamma ray signal is set out in *Evaluation of Cementing Practices by Quantitative Radiotracer Measurements*, Kline W. E., IADC/SPE 14778, (1986). In this model, the signal I from the tagged cement in a plane perpendicular to the well-bore at any depth is given by Equation 1, assuming that any by-passed mud is located in a layer adjacent to the formation. The radius r is a superficial equivalent for a circular wellbore.

$$I = k \int_{\text{outer radius of casing}}^{\text{outer radius of cement}} \frac{\exp(\mu_{cement}r)dr}{r} \quad (1)$$

The parameter $\mu_{cement}$, which is the gamma ray absorption coefficient of the cement sheath, is determined experimentally by laboratory measurements is which tagged cement was poured around sections of casing into molds of various sizes. For a given casing size, the fractional gamma ray absorption by the steel and fluid inside the casin is constant and hence can be represented by the constant k.

Similarly, the gamma ray log can be interpreted using the techniques disclosed in U.S. Pat. No. 4,825,071, which is hereby incorporated by reference in its entirety. The analysis of KCl in the drilling mud that is set out in detail in the '071 patent is applicable to the present analysis of KCl in the cement.

Borehole Compensation

Calculation of a relative distance parameter can greatly enhance the diagnostic capabilities of multiple-tracer logs and can provide information not otherwise apparent from the logs themselves. The relative distance parameter is determined in terms of a simple physical model that shows how relative distance values are obtained from gamma-ray spectroscopy data when multiple isotopes are present. The model is calibrated on the basis of data collected from a test formation in the laboratory.

Figure 2:
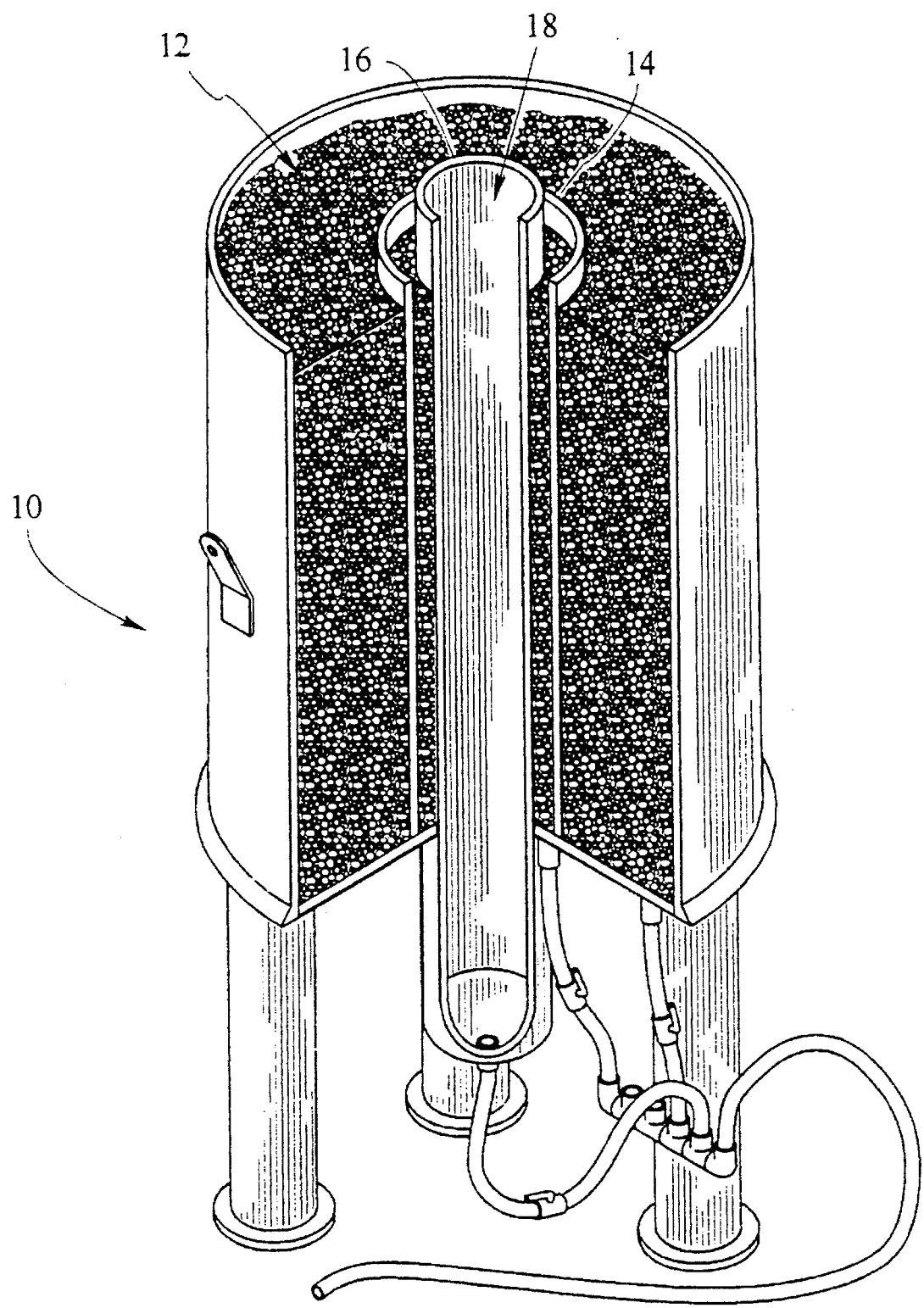
FIG. 2 is a perspective view showing a test formation for tracer calibration.

An example of such a test formation 10 is shown in FIG. 2. The test formation 10 is preferably constructed so as to include an annular formation 12, a cement annulus 14, a casing 16 and a central borehole 18. The calibration procedure entails pumping tracer-tagged water into the pore spaces of the various individual annuli and into the borehole casing and making measurements with different spectroscopy tools. Because the actual fractures containing tagged material are relatively narrow and the proppant in the fracture is similar to the actual formation matrix, the physics of gamma-ray transport is approximately the same as when the tagging agent is uniformly distributed around the measuring tool.

Figure 3:
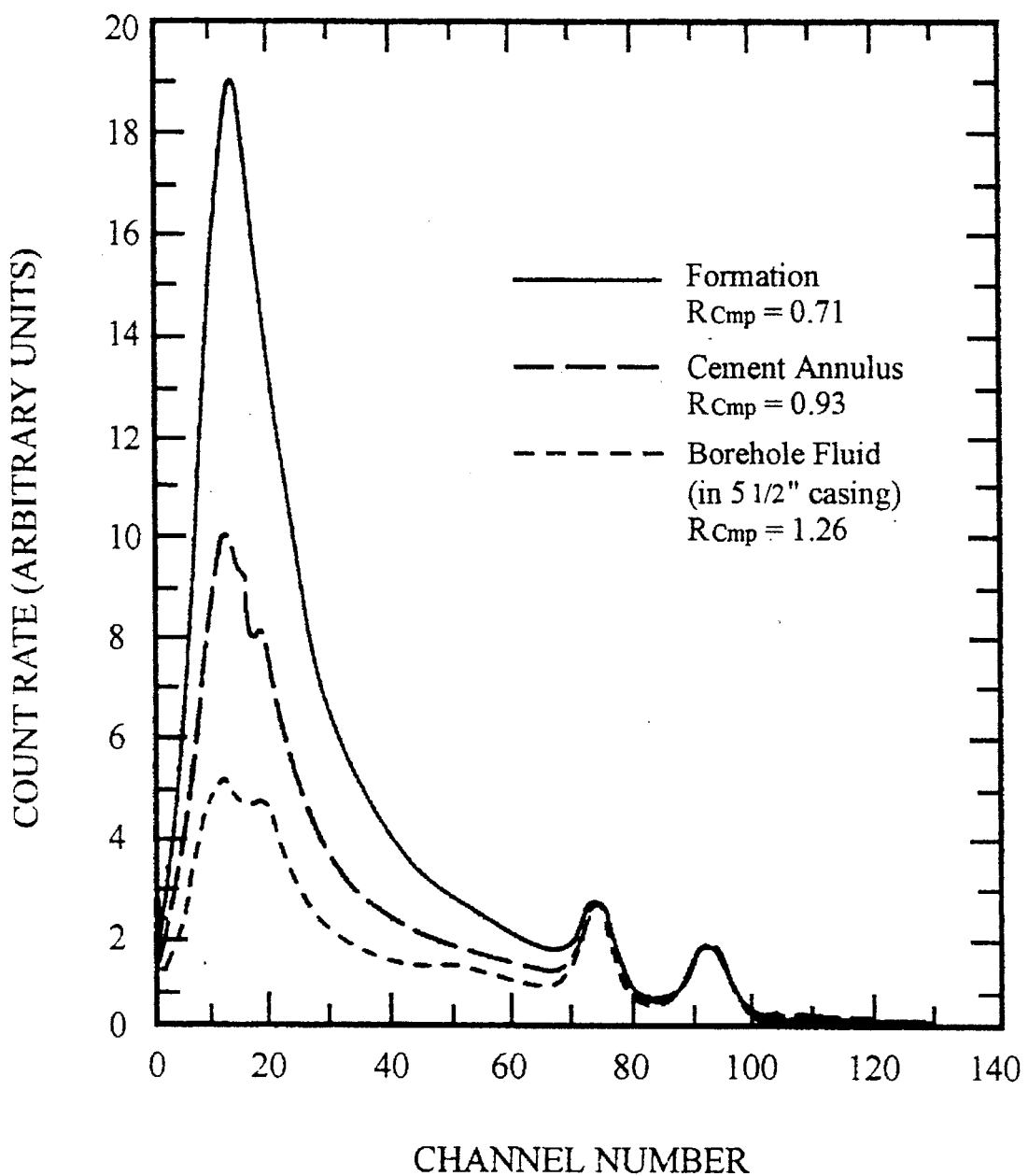
FIG. 3 is a plot showing $^{46}$Sc spectral signatures from different locations showing Compton scattering effects.

Spectral signatures for $^{46}Sc$ for the three different annuli of FIG. 2 are shown in FIG. 3. These signatures demonstrate the relative increase in the low-energy part of the spectrum from the Compton-scattering effect as the distance between the tracer and the detector increases. The region inside the borehole casing is the borehole component and the formation outside the cement annulus is the formation component. The WLS algorithm assumes that only borehole and formation regions contain tracers. Experience has shown that any other distribution can be well approximated by a linear combination of these two components. Thus, as discussed above, the composite spectrum obtained by summing the borehole and formation contributions for each isotope can be used to determine the apparent Compton ratio for that isotope from the WLS analysis of the gamma-ray spectroscopy log data, even when more than one isotope is present.

The relationship between the Compton ratio, $R_{Cmp}$, and the diameter D of an annulus containing a tracer that emits gamma rays, may be expressed by the following equation:

$$R_{Cmp} = A + B/D^2, \quad (2)$$

where A and B are parameters that vary according to radionuclide type and the specific borehole geometry. Variations on this equation will be obtained, depending on the mathematical analysis used and the particular parameters of each well analysis. The processing algorithm solves Equation (2) for D to obtain a diameter estimate. This diameter measurement is affected by field borehole geometries and tracer distributions that are different from the laboratory test formation and by statistical variations in the measurements.

Interpretation of Results

At some points the calculated cement radius will be smaller than the corresponding known wellbore radius. At these points the cement does not completely fill the annulus and it will be necessary to add additional cement if complete plugging of the well at this point is desired. Similarly, at some points the calculated cement radius will greater than the wellbore radius. These enlargements reflect hole washout caused by post drilling operations such as drill pipe trips, casing running, mud conditioning and cementing. Hole washout is greatest in washout prone shales or shaley sands and is least significant in permeable sands.

While a preferred embodiment of the invention has been shown and described, modifications thereof can be made by one skilled in the art without departing from the spirit of the invention.

What is claimed is:

1. A method for determining the thickness of cement that has been placed in an annulus between a casing string and a wellbore in a formation, comprising the steps of:

(a) logging the amount of radioactivity emitted by a naturally occurring radioactive material in the formation prior to emplacement of the casing and cement to produce a first log;

(b) including in the cement an amount of the same radioactive material;

(c) placing the casing and cement in the wellbore;

(d) logging the amount of radioactivity emitted by said radioactive material and transmitted through the casing to produce a second log; and (e) calculating the amount of cement in the annulus by determining the amount of said radioactive material in the annulus using information from said first and second logs.

2. The method according to claim 1 wherein step (e) includes the steps of (e1) compensating the log generated in step (a) for attenuation, and (e2) subtracting said compensated log from the log generated in step (d) to yield a net log.

3. The method according to claim 2 wherein step (e) further includes the step of (e3) using the net log to quantitatively calculate the amount of radioactive material present in the annulus.

4. The method according to claim 2 wherein step (e1) includes the step of compensating for attenuation due to the cement, the casing and fluid in the casing.

5. The method according to claim 1 wherein said radioactive material is potassium-40 ($^{40}K$), and is added as a naturally occurring isotope included in potassium chloride.

6. The method according to claim 1 wherein step (a) further includes the step of spectrally logging radioactivity emitted by a plurality of radioactive materials in the formation.

7. The method according to claim 6 wherein said radioactive materials include potassium, thorium, and uranium.

8. The method according to claim 6 wherein step (e) includes the steps of
 (e1) compensating the log generated in step (a) for attenuation;
 (e2) subtracting said compensated log from the log generated in step (d) to yield a net log; and
 (e3) using the net log to quantitatively calculate the amount of radioactive material present in the annulus.

9. The method according to claim 8 wherein said radioactive material is potassium-40 ($^{40}$K), and is added as a naturally occurring isotope included in potassium chloride.

* * * * *